United States Patent [19]

Magalotti

[11] Patent Number: 5,067,277
[45] Date of Patent: Nov. 26, 1991

[54] SHUTTER OPENING DEVICE PARTICULARLY FOR PLEASURE CRAFT HATCHWAYS

[75] Inventor: Gianfranco Magalotti, Cella, Italy

[73] Assignee: NEMO S.p.A., Sarsina, Italy

[21] Appl. No.: 559,911

[22] Filed: Jul. 30, 1990

[30] Foreign Application Priority Data

Aug. 4, 1989 [IT] Italy .............................. 4886/89[U]

[51] Int. Cl.⁵ ............................................. E05F 1/10
[52] U.S. Cl. ...................................... 49/386; 49/379; 188/300; 267/64.12
[58] Field of Search .......................... 49/386, 379, 344; 16/84, DIG 9; 267/64.12; 188/300

[56] References Cited

U.S. PATENT DOCUMENTS

| | | | |
|---|---|---|---|
| 4,208,840 | 6/1980 | Jentoft et al. | 49/386 X |
| 4,580,647 | 4/1986 | Peifer et al. | 267/64.1 X |
| 4,845,905 | 7/1989 | Frank | 49/386 X |
| 4,856,762 | 8/1989 | Selzer | 267/64.12 |
| 4,944,705 | 7/1990 | Kashima et al. | 267/64.12 X |

*Primary Examiner*—Philip C. Kannan
*Attorney, Agent, or Firm*—Guido Modiano; Albert Josif

[57] ABSTRACT

The shutter opening device, particularly for pleasure craft hatchways, has a gas spring type pneumatic cylinder which actuates the closing and opening movements of the shutter of hatch. A control rod protrudes from the stem of the cylinder, and a pivoting lever acts upon the rod. A button is used to keep the lever in one of the two positions which either locks the stem in a secured position or permits the stem to freely slide.

1 Claim, 3 Drawing Sheets

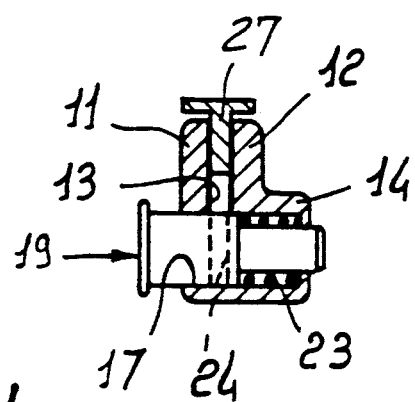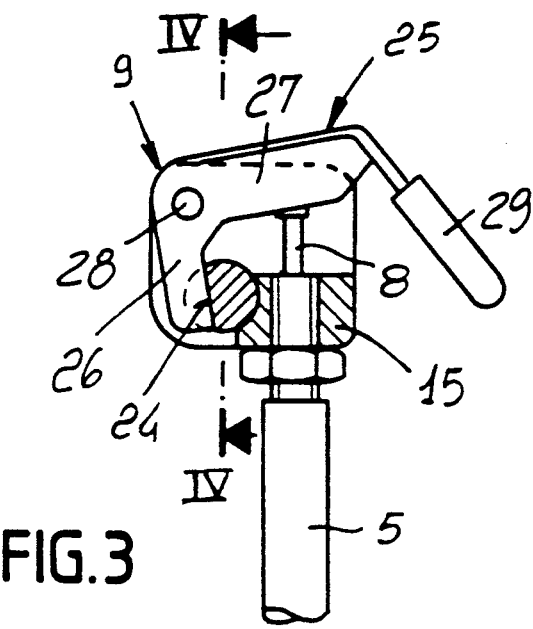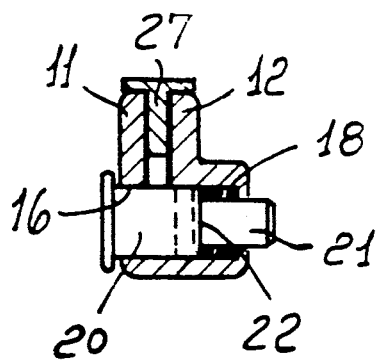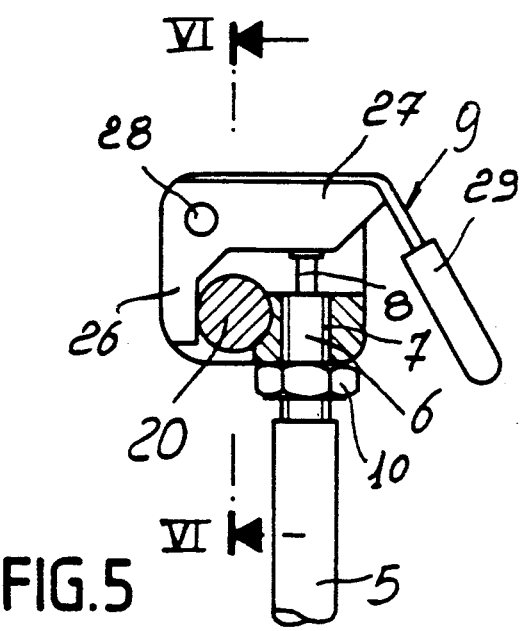

SHUTTER OPENING DEVICE PARTICULARLY FOR PLEASURE CRAFT HATCHWAYS

BACKGROUND OF THE INVENTION

The present invention relates to a shutter opening device particularly for pleasure craft hatchways.

Among devices used to close and open shutters or hatches, for example of hatchways, the following are known: mechanically-acting devices without counterweights, using rigid telescoping props which support the hatch of the hatchway; mechanical devices with counterweights which employ a friction hinge in which a helical spring is applied with the purpose of counterbalancing the weight of the hatch; and, finally, devices which use pneumatic cylinders also known as gas springs.

The disadvantages of said known devices consist in that in the first case, during the opening and closure steps the weight is not counterbalanced, whereas in the other cases placement at intermediate angles between the angles of complete opening and closure is hindered.

SUMMARY OF THE INVENTION

The aim of the present invention is therefore to obviate these disadvantages by providing a shutter opening device, particularly for hatchways, allowing the securing of the shutter in any desired position.

Within the scope of this aim, a further object of the invention is to provide a device which is simple in concept and safely reliable in operation.

This aim and this object are achieved, according to the invention, by the present shutter opening device, particularly for pleasure craft hatchways, characterized in that it comprises a pneumatic cylinder of the "gas spring" type for the actuation of the closure shutter of the hatchway, with a stem wherefrom a control rod protrudes, a comand lever for actuating said control rod articulated to the end of the stem and a button adapted for keeping said lever in one of two positions, said lever actuating, in one of said two positions, the rod in a position for the free sliding of the stem in both directions, said lever actuating, in said other position, said rod in a position for securing the stem.

BRIEF DESCRIPTION OF THE DRAWINGS

Further characteristics of the invention will become apparent from the detailed description of a preferred but not exclusive embodiment of the device, illustrated only by way of non-limitative example in the accompanying drawings, wherein:

FIG. 3 is a partially sectional side view of the end of the device for actuating the hatch with the lever in securing position;

FIG. 4 is a sectional view taken along the plane IV—IV of FIG. 3;

FIG. 5 is a partially sectional side view of the end of the actuation device with the lever in free position;

FIG. 6 is a sectional view taken along the plane VI—IV of FIG. 5.

DESCRIPTION OF THE PREFERRED EMBODIMENTS

Figure 1:
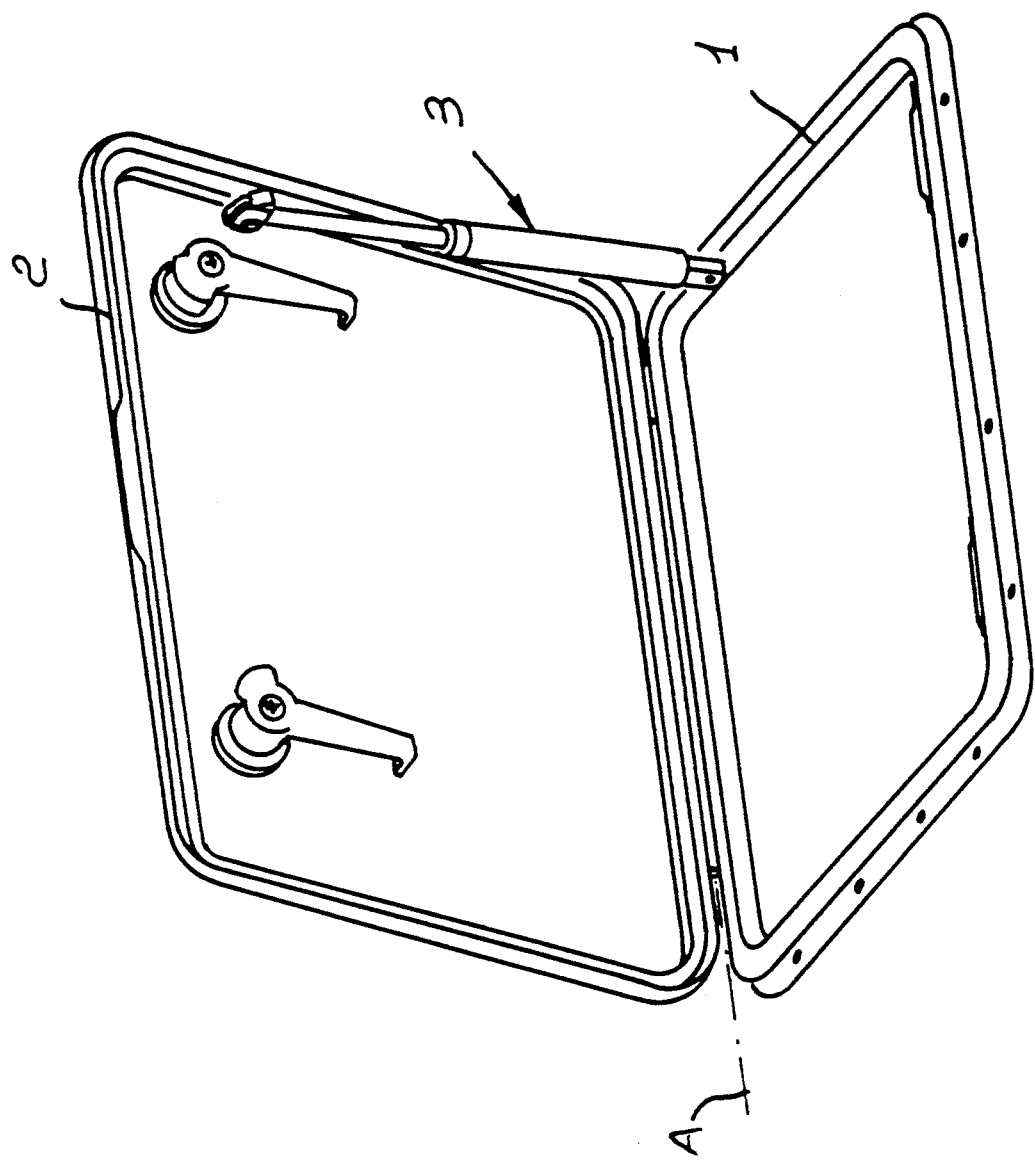
FIG. 1 is a perspective view of a hatchway to which the device according to the invention is applied.
Figure 2:
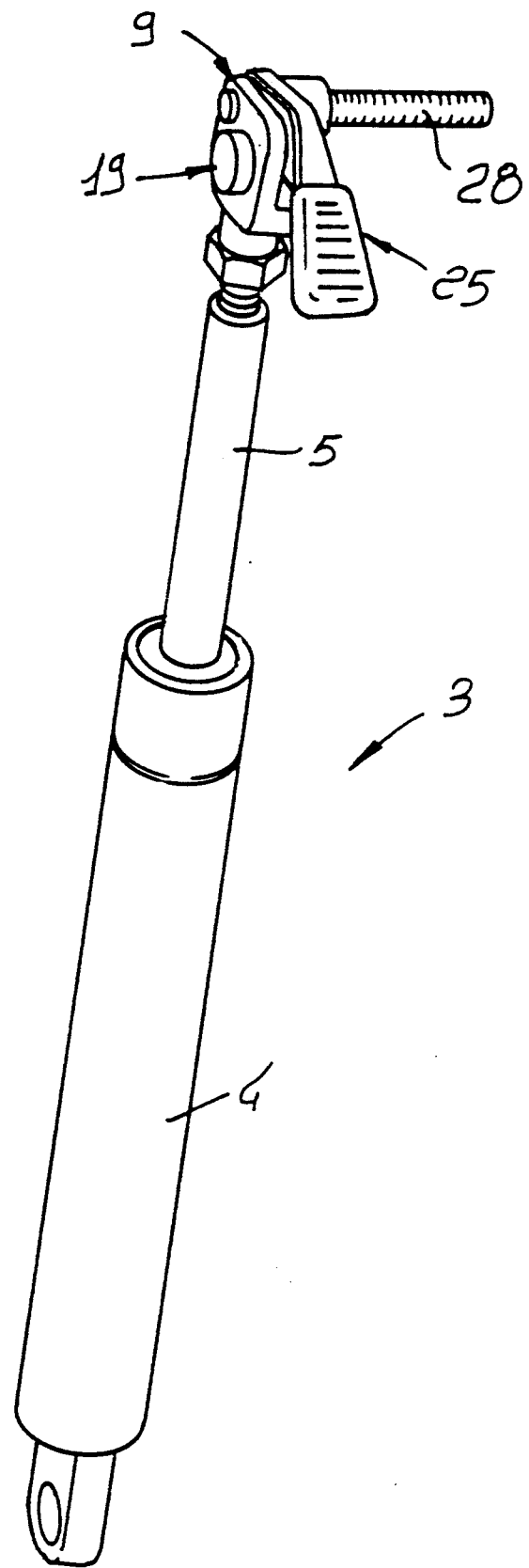
FIG. 2 is a perspective view of said opening device.

With reference to the FIGURES, the reference numeral 1 indicates the hatchway which is closed by the shutter or hatch 2 which is hinged to the hatchway along the axis A. The opening device 3 acts between the hatch 2 and the hatchway 1.

The device 3 has a conventional pneumatic cylinder, known as "gas spring", which is formed by a cylinder 4 in which a stem 5 slides. The stem 5 is hollow and extends, at its upper end, with a tang 6 which has an external thread 7 (FIG. 5). The stem 5 and the tang 6 are slidably traversed by a control rod 8 which protrudes from the tang 6 with one of its ends. The rod 8 controls the valves inside the cylinder 4, which are not illustrated in the drawing, but are arranged so as to allow the free movement of the piston of the cylinder when the rod 8 is pressed. A head 9 is screwed on the thread of the tang 6, and the coupling is ensured by a lock nut 10.

The head 9 is formed by two walls 11, 12 which are arranged parallel to one another and are divided by an interspace 13.

A sleeve 14 extends outward from the wall 12 and is perpendicular thereto. The walls 11, 12 are mutually joined downward by a bridge 15, in which the threaded hole in which the tang 6 is screwed is defined. A through opening 16 is defined coaxially to the sleeve 14 in the wall 11, and its diameter is equal to the inner diameter of the sleeve 14. In this manner, a cylindrical seat 17 which passes through the interspace 13 is defined.

The outer end of the sleeve 14 has an inner annular raised portion which forms a shoulder 18. The seat 17 slidably accommodates a button 19 in the shape of a cylindrical pin with two portions 20, 21 with different diameters, thus defining an annular shoulder 22. The smaller-diameter portion 21 engages the opening of the sleeve 14, and a spring 23 is centered thereon and remains compressed between the shoulders 18, 22.

A notch 24 is defined in the portion 20, proximate to the shoulder 22, and is intended to be engaged as described hereinafter. In order to prevent the spring 23 from pushing the button 19 out of the hole 16, a stop element is provided which stops the button 19 in the position in which the notch 14 is aligned with the interspace 13. Such a stop element can be constituted for example by a screw axially screwed in the portion 21 with its head abutting frontally on the sleeve 14.

The interspace 13 accommodates a lever 25 with two arms 26, 27 which are advantageously mutually perpendicular; the arm 26 extends substantially parallel to the stem 5. The lever 25 is pivoted between the walls 11, 12 by means of a pivot pin 28 located at a corner of the head 9 which is diagonally opposite to the one related to the bridge 15 and extends with a threaded portion for coupling to the hatch 2.

The arm 27, which is substantially orthogonal to the stem 5, rests on the top of the rod 8 and has a free end extending with a handgrip 29 which is oblique with respect thereto.

The operation of the described device is as follows.

Assume one starts from a condition in which the hatch 2 is in the position which closes the hatchway 1 and the lever 25 is rotated so that the stem is secured. In this position (FIG. 3), the handgrip 29 of the lever 25 is in a raised position and the arm 26 of said lever is in a rotated position for engagement in the notch 24 of the button 19. When the cylinder 3 is to be released, one acts on the handgrip 29, compressing the rod 8, so that the cylinder 3, under the thrust of the compressed gas, extends and raises the hatch 2. The lifting action continues until the lever 25 and therefore the rod 8 remain pressed, i.e. in the position of FIG. 5.

By releasing the lever 25, the arm 26 retracts into the notch 24 and the rod 8 is pushed out, allowing the securing of the hatch 2 in the position thus reached. When the cylinder 3 is to be kept free to extend or retract, the button 19 is inserted after actuating the lever 25 in the position of FIG. 5. In this position the inner edge of the arm 26 disengages from the notch 24 and remains in contact with the surface of the button 19 by virtue of the thrust exerted on the arm 27 by the rod 8.

The friction between the two surfaces of 26 and 19 which are in contact opposes the thrust of the compressed spring 23 when the button 19 is pressed.

In this manner the button 19 remains retained in a position in which the lever 25 keeps the rod 8 in a position for releasing the cylinder 3. It should be noted that the retraction of the cylinder is obtained by exerting a force which is sufficient to overcome the internal pressure. To return the device to the condition for securing the cylinder 3, one acts gently on the handgrip 29, which under the action of the spring 23 releases the button 19, so that the arm 26 of the lever can engage, as in the first described condition, the notch 24 of the button.

The advantages of the device according to the invention with respect to the conventional devices described initially are constituted by the fact that the hatch 2 can assume any position between complete opening and complete closure.

In the practical embodiment of the invention, the materials employed, the shape and dimensions may be any according to the requirements.

What is claimed is:

1. Shutter opening device, particularly for pleasure craft hatchways, comprising a pneumatic cylinder of the "gas spring" type for the actuation of the closure shutter of the hatchway, said cylinder having a stem provided with an end tang wherefrom a control rod protrudes, a head associated to said tang, said head being formed by two mutually parallel walls which are separated by an interspace and are joined by a lower bridge, one of said walls having a through opening and the other of said wall extending with a sleeve which is coaxial with said through opening, thus defining a seat extending through said interspace, a comand lever for actuating said control rod articulated to the end of the stem and a button slidably engaging said seat and adapted for keeping said lever in one of two positions, said lever actuating, in one of said positions, the rod in a position for the free sliding of the stem in both directions, said lever actuating, in the other position, said rod in a position for securing the stem, said sleeve having an internal raised portion which defines a shoulder and said button being constituted by a pin having two portions with different diameters which define a shoulder, the smaller-diameter portion engaging said sleeve and the larger-diameter portion having a notch formed proximate to said shoulder, a spring being superimposed on said smaller-diameter portion, said spring being compressed between said shoulder of the button and said shoulder of the sleeve, said lever comprising two arms which are perpendicular to one another, a first one of said arms extending substantially parallel to the stem of said cylinder, the other one extending with a handgrip, said first arm engaging said notch in said position for securing the stem and out of said notch in said position for free sliding of the stem.

* * * * *